US010127136B2

(12) United States Patent
Denise et al.

(10) Patent No.: US 10,127,136 B2
(45) Date of Patent: Nov. 13, 2018

(54) IDENTIFYING AND VISUALIZING SUBOPTIMAL MEMORY LAYOUTS IN SOFTWARE PROGRAMS

(71) Applicant: Oracle International Corporation, Redwood Shores, CA (US)

(72) Inventors: Jean-François Denise, Biviers (FR); Charles J. Hunt, Libertyville, IL (US); Steven J. Drach, San Francisco, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 63 days.

(21) Appl. No.: 15/004,328

(22) Filed: Jan. 22, 2016

(65) Prior Publication Data

US 2017/0091070 A1 Mar. 30, 2017

Related U.S. Application Data

(60) Provisional application No. 62/232,270, filed on Sep. 24, 2015.

(51) Int. Cl.
*G06F 9/44* (2018.01)
*G06F 11/36* (2006.01)
(Continued)

(52) U.S. Cl.
CPC ........ *G06F 11/3612* (2013.01); *G06F 3/0482* (2013.01); *G06F 3/04842* (2013.01);
(Continued)

(58) Field of Classification Search
CPC ....... G06F 3/06–3/0689; G06F 11/34–11/3696
See application file for complete search history.

(56) References Cited

U.S. PATENT DOCUMENTS

| 5,815,718 A | 9/1998 | Tock |
| 6,076,090 A | 6/2000 | Burroughs |

(Continued)

OTHER PUBLICATIONS

Che, Shuai et al., "Dymaxion: Optimizing Memory Access Patterns for Heterogeneous Systems", pp. 1-11. (Year: 2011).*

(Continued)

*Primary Examiner* — Thuy Dao
*Assistant Examiner* — Christopher J Franco
(74) *Attorney, Agent, or Firm* — Tarolli, Sundheim, Covell & Tummino LLP

(57) ABSTRACT

The disclosed embodiments provide a system that facilitates execution of a software program. During operation, the system obtains an execution unit associated with execution of a software program, wherein the execution unit includes a start and an end. Next, the system identifies a set of fields accessed within the execution unit. The system then calculates one or more memory distances among the set of fields from a set of memory addresses of the set of fields during runtime of the software program on the computer system, wherein the one or more memory distances include a difference in memory address between a first field and a second field in the set of fields. Finally, based at least in part on a memory distance in the one or more memory distances exceeding a threshold, the system stores an indication that the execution unit has a suboptimal memory layout.

15 Claims, 10 Drawing Sheets

(51) Int. Cl.
*G06F 3/06* (2006.01)
*G06F 12/0802* (2016.01)
*G06F 3/0484* (2013.01)
*G06F 3/0482* (2013.01)

(52) U.S. Cl.
CPC .......... *G06F 3/0608* (2013.01); *G06F 3/0653* (2013.01); *G06F 3/0673* (2013.01); *G06F 12/0802* (2013.01); *G06F 2212/1044* (2013.01); *G06F 2212/60* (2013.01)

(56) References Cited

U.S. PATENT DOCUMENTS

| | | | |
|---|---|---|---|
| 8,468,500 B2* | 6/2013 | Hatabu | G06F 11/3636 717/124 |
| 8,539,455 B2* | 9/2013 | Berg | G06F 11/3447 711/147 |
| 8,780,114 B1* | 7/2014 | Jackey | G06F 11/323 345/440 |
| 9,250,874 B1 | 2/2016 | Verwaest | |
| 9,471,482 B2* | 10/2016 | Magdon-Ismail | G06F 11/3461 |
| 9,910,591 B2 | 3/2018 | Denise et al. | |
| 2007/0079306 A1 | 4/2007 | Qumei | |
| 2008/0119178 A1 | 5/2008 | Peddireddy | |
| 2008/0163176 A1 | 7/2008 | Krauss | |
| 2008/0244533 A1* | 10/2008 | Berg | G06F 11/3447 717/128 |
| 2009/0199169 A1 | 8/2009 | Lin | |
| 2010/0257511 A1* | 10/2010 | Hatabu | G06F 11/3636 717/131 |
| 2013/0254510 A1 | 9/2013 | Brehmer | |
| 2015/0186293 A1* | 7/2015 | Lin | G06F 9/3455 711/123 |
| 2016/0103828 A1 | 4/2016 | Woolf | |
| 2016/0239212 A1* | 8/2016 | Solihin | G06F 11/3037 |
| 2016/0259628 A1* | 9/2016 | Schuchman | G06F 11/3688 |

OTHER PUBLICATIONS

Peluso, Sebastiano et al., "Application Transparent Migration of Simulation Objects with Generic Memory Layout", pp. 1-9. (Year: 2011).*

Cho, Doosan et al., "Adaptive Scratch Pad Memory Management for Dynamic Behavior of Multimedia Applications", pp. 554-567. (Year: 2009).*

Che, Shuai et al. "Dymaxion++: A Directive-based API to Optimize Data Layout and Memory Mapping for Heterogeneous Systems", pp. 916-924. (Year: 2014).*

Cho, Doosan et al., "Software Controlled Memory Layout Reorganization for Irregular Array Access Patterns", pp. 179-188. (Year: 2007).*

Kandemir, Mahmut et al., "Compiler-Directed Selection of Dynamic Memory Layouts", pp. 219-224. (Year: 2001).*

* cited by examiner

IDENTIFYING AND VISUALIZING SUBOPTIMAL MEMORY LAYOUTS IN SOFTWARE PROGRAMS

RELATED APPLICATIONS

This application claims priority under 35 U.S.C. § 119(e) to U.S. Provisional Application Ser. No. 62/232,270, entitled "Identifying and Visualizing Suboptimal Memory Layouts in Software Programs," by Jean-Francois Denise, Charles J. Hunt and Steven J. Drach, filed on Sep. 24, 2015, the contents of which are herein incorporated by reference The subject matter of this application is related to the subject matter in a co-pending non-provisional application by the same inventors as the instant application, entitled "Visualizations of Memory Layouts in Software Programs," having Ser. No. 14/533,948, and filing date 5 Nov. 2014.

The subject matter of this application is related to the subject matter in a co-pending non-provisional application by the same inventors as the instant application and filed on the same day as the instant application, entitled "Configurable Memory Layouts for Software Programs," having Ser. No. 14/864,514, and filing date Sep. 24, 2015.

The subject matter of this application is related to the subject matter in a co-pending non-provisional application by the same inventors as the instant application and filed on the same day as the instant application, entitled "Graphical Editing of Memory Layout Rules for Software Programs," having Ser. No. 14/864,531, and filing date Sep. 24, 2015.

BACKGROUND

Field

The disclosed embodiments relate to techniques for improving memory usage in software programs. More specifically, the disclosed embodiments relate to techniques for identifying and visualizing suboptimal memory layouts in software programs.

Related Art

Developers of software programs are typically unaware of how data structures and/or objects in the software programs are laid out in memory. As a result, the developers may create objects and/or data structures that result in suboptimal execution and/or memory consumption of the software programs. For example, a developer may declare fields in a software program without considering the alignment requirements of the fields, resulting in a greater amount of padding in the software program than if the fields were declared in a different order and/or using different types. Because the padding represents memory that does not contain useful data, the padding may unnecessarily increase the memory consumption of the software program and reduce the cache utilization of a processor on which the software program executes.

Consequently, the development and execution of software programs may be facilitated by mechanisms for improving the knowledge and management of memory consumption in the software programs.

SUMMARY

The disclosed embodiments provide a system that facilitates execution of a software program. During operation, the system obtains an execution unit associated with execution of a software program, wherein the execution unit includes a start and an end. Next, the system identifies a set of fields accessed within the execution unit. The system then calculates one or more memory distances among the set of fields from a set of memory addresses of the set of fields during runtime of the software program on the computer system, wherein the one or more memory distances include a difference in memory address between a first field and a second field in the set of fields. Finally, based at least in part on a memory distance in the one or more memory distances exceeding a threshold, the system stores an indication that the execution unit has a suboptimal memory layout.

In some embodiments, the system also converts the one or more memory distances into one or more scores. Next, the system aggregates the one or more scores into an overall score for the execution unit. The system then orders the execution unit with one or more additional execution units in the software program by the overall score.

In some embodiments, calculating the memory distance among the set of fields includes obtaining an average difference in the memory addresses between a pair of fields in the set of fields.

In some embodiments, the start of the execution unit includes a thread start event and the end of the execution unit includes a thread end event.

In some embodiments, the start of the execution unit is obtained from a user and the end of the execution unit comprises a duration of time after the start of the execution unit.

In some embodiments, the threshold is associated with a cache line of a processor cache in the computer system.

In some embodiments, the system also displays a visualization of the suboptimal memory layout.

In some embodiments, the visualization includes a center representing a memory address of a selected field from the set of fields, and one or more fields in one or more regions around the center, wherein each of the one or more regions represents a relative distance in memory address from the center.

BRIEF DESCRIPTION OF THE FIGURES

In the figures, like reference numerals refer to the same figure elements.

DETAILED DESCRIPTION

Figure 1:
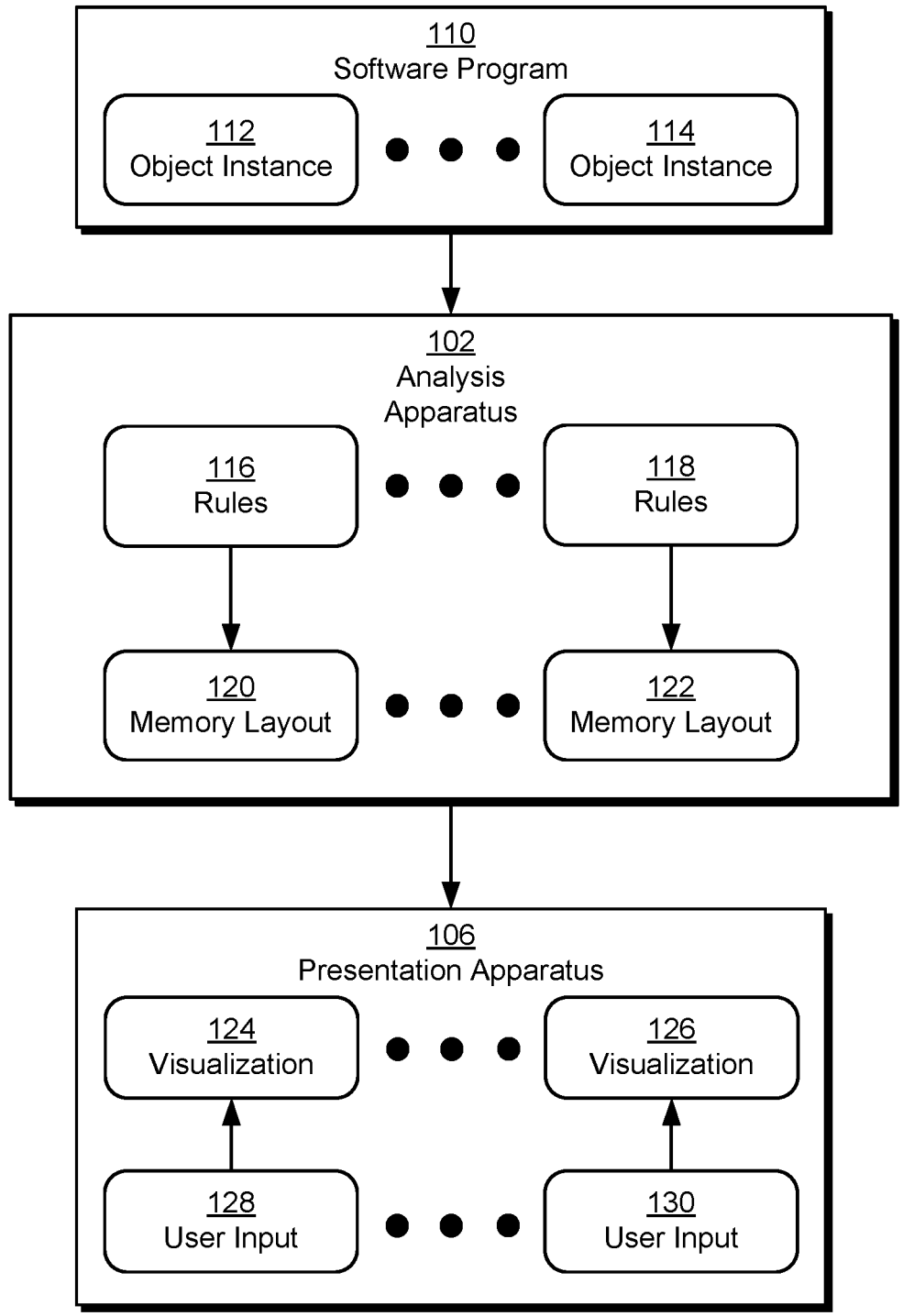
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating the execution of a software program. During development of the software program, source code for the software program may be created using a programming language. The source code may then be compiled into an executable form to enable the execution of the software program.

More specifically, the disclosed embodiments provide a method and system for improving memory usage in the software program by configuring memory layouts for object instances in the software program based on user-defined rules. For example, a developer of the software program may create a set of rules related to the ordering and/or grouping of fields in a class from which an object instance is created and/or one or more parent classes of the class.

To facilitate configuration of the memory layouts, the rules may be created using a graphical mechanism. For example, the memory layout may be displayed within a graphical user interface (GUI) as a visualization that includes graphical representations of fields in the base class and/or parent. The GUI may include graphical distinctions between fields of different sizes and/or fields owned by different classes. User input may be received through the GUI, and the user input may be used to update the visualization and create rules for configuring the memory layout. The rules may then be stored in association with the software program for subsequent retrieval and use.

After the rules are created, the rules may be matched to object instances in the software program and used to generate the memory layouts of the object instances. First, an association between each of the rules and the object instance may be identified. For example, a rule may include a class identifier, which is matched to the class name of a class from which an object instance is created and/or a parent class of the class. Next, the rules may be applied to one or more fields of the object instance. For example, the rules may be used to group a set of fields in the object instance and/or order the set of fields within the group. The software program may then be executed using the generated memory layout.

The rules may additionally be used to update the memory layout during runtime of the software program. For example, a rule may specify a condition to be met, such as a memory usage of the software program. In turn, the rule may be applied only when the condition matches a runtime condition of the software program.

Finally, the disclosed embodiments may provide functionality for identifying suboptimal memory layouts in the software program, which in turn may benefit from configuration using user-defined rules. In particular, suboptimal memory layouts in the software program may be identified using execution units associated with execution of the software program. Each execution unit may include a start and an end. For example, the duration of an execution unit may be bounded by a thread start event and a thread end event of a given thread in the software program. Alternatively, the start of the execution unit may be obtained from a user, and the end of the execution unit may be represented by a duration of time after the start.

To determine a suboptimal memory layout associated with each execution unit, a set of fields accessed within the execution unit may be identified, and one or more memory distances among the fields may be calculated from memory addresses of the fields during runtime of the software program. Each memory distance may represent a difference in memory address between two fields in the execution unit. If one or more memory distances exceed a threshold, the execution unit may have a suboptimal memory layout. In turn, an indication of the suboptimal memory layout may be stored, and a visualization of the suboptimal memory layout may be displayed to assist in the creation of rules that can be used to improve the memory layout.

FIG. 1 shows a schematic of a system in accordance with the disclosed embodiments. The system may be used to facilitate the execution of a software program 110. Software program 110 may be a standalone application, operating system, enterprise application, database, library, device driver, and/or other type of software. In addition, software program 110 may be executed in a variety of environments. For example, software program 110 may be executed on a single desktop computer or workstation, or software program 110 may be distributed across multiple servers within a data center. Along the same lines, software program 110 may be executed sequentially or in parallel on one or more processors and/or processor cores.

Software program 110 may also execute independently of the platform of the computer system on which software program 110 executes. For example, a virtual machine such as a Java (Java™ is a registered trademark of Oracle America, Inc.) Virtual Machine (JVM) may be used to execute software program 110 on the computer system regardless of the operating system, drivers, and/or hardware on the computer system.

More specifically, the system of FIG. 1 may include functionality to improve memory usage by object instances 112-114 in software program 110. Each object instance 112-114 may be an instance of a class and/or other template for creating objects in software program 110. As shown in FIG. 1, the system includes an analysis apparatus 102 and a presentation apparatus 106. Each of these components is described in further detail below.

Analysis apparatus 102 may generate a set of memory layouts 120-122 for object instances 112-114. Each memory layout may include an arrangement and/or ordering of fields within the corresponding object instance. The memory layout may optionally include the memory addresses occupied by the fields and/or padding in the object instance.

To generate memory layouts 120-122, analysis apparatus 102 may create a set of logical representations of object instances 112-114 from class descriptions, compiled classes, and/or memory dumps associated with software program 110. Next, the logical representations may be converted into structural representations that contain standard binary versions of components in object instances 112-114. A virtual machine instance may be configured to operate within the execution context, and the structural representations may be provided to the virtual machine instance for generation of memory layouts 120-122 from the structural representations. Generation of memory layouts is described in a co-pending non-provisional application by the same inventors as the instant application, entitled "Visualizations of Memory Layouts in Software Programs," having Ser. No. 14/533,948, and filing date 5 Nov. 2014, which is incorporated herein by reference.

Those skilled in the art will appreciate that memory layouts 120-122 may be generated in various ways and/or execution contexts. For example, memory layouts 120-122 may be generated during loading of the corresponding classes into a runtime environment such as a virtual machine instance. Object instances 112-114 may be created according to memory layouts 120-122, and software program 110 may be executed using memory layouts 120-122 and/or object instances 112-114. Alternatively, representations of memory layouts 120-122 may be created and stored as metadata for the corresponding classes and/or object instances 112-114 independently of execution of object instances 112-114 within software program 110.

During generation of memory layouts 120-122, analysis apparatus 102 may configure each memory layout by applying one or more custom, user-defined rules 116-118 to the memory layout. Rules 116-118 may override global and/or default layout rules for the platform and/or execution context of software program 110. For example, default layout rules for the platform of software program 110 may dictate the separation of fields from different classes in an inheritance hierarchy of an object instance within a memory layout of the object instance. The default layout rules may also order fields within each class by field size and/or field type. On the other hand, rules 116-118 may identify specific classes to which rules 116-118 are applicable and specify arbitrary groupings and/or orderings of fields from different classes in the inheritance hierarchies of object instances 112-114. In other words, rules 116-118 may allow a user such as a developer of software program 110 to improve the speed and/or memory usage of software program 110 by customizing runtime memory layouts 120-122 of specific object instances 112-114 within software program 110. Configuring memory layouts of object instances in software programs based on user-specified rules is described in further detail below with respect to FIG. 2A.

To facilitate analysis and/or understanding of memory layouts 120-122 by the user, presentation apparatus 106 may display visualizations 124-126 associated with memory layouts 120-122. For example, presentation apparatus 106 may provide visualizations 124-126 within a graphical user interface (GUI) and update visualizations 124-126 based on user input 128-130 received through the GUI.

In one or more embodiments, visualizations 124-126 are used to obtain rules 116-118 for configuring memory layouts 120-122 of object instances 112-114. Each visualization may include a graphical representation of an object instance in memory. For example, the arrangement of fields within the object instance may be represented by rows of graphical objects such as rectangles. The visualization may also include graphical distinctions between fields of different sizes and/or fields from different classes in the object instance's inheritance hierarchy. For example, a larger field may be represented by a longer rectangle, and a smaller field may be represented by a shorter rectangle. Similarly, the fields may be color-coded, shaded, and/or otherwise distinguished according to the classes in the inheritance hierarchy of the object instance from which the fields are obtained.

To generate rules 116-118 using visualizations 124-126, the user may provide user input 128-130 for selecting classes (e.g., templates for object instances) and/or fields associated with a given rule. For example, the user may select a class from a list of classes in software program 110 that is displayed by presentation apparatus 106. Alternatively, the class may be included in a list of classes associated with a package, module, and/or set of binary files. After the class is selected, presentation apparatus 106 may display a list of fields in the inheritance hierarchy of the class, and the user may use the list to select one or more fields from the class and/or one or more fields from a parent class of the class.

Representations of the selected fields may then be displayed within a visualization, and the user may interact with the visualization to define one or more rules for the fields. For example, the user may use one or more editing tools to order and/or group the fields within the visualization. After a set of rules is created for the class, the user may order the rules by precedence. The rules may then be stored in a configuration file and/or other representation that is separate from source code for software program 110, and analysis apparatus 102 may use the stored rules to generate a memory layout for an object instance created from the class. Graphical editing of memory layout rules for object instances of software programs is described in further detail below with respect to FIG. 2B.

Analysis apparatus 102 and presentation apparatus 106 may further include functionality to identify suboptimal memory layouts in software program 110, which may subsequently be improved by defining and applying rules for configuring the memory layouts. In particular, analysis apparatus 102 may obtain an execution unit associated with execution of software program 110. The execution unit may include a start and an end, such as a thread start event and a thread end event for a thread in software program 110. Next, analysis apparatus 102 may identify a set of fields accessed within the execution unit and calculate one or more memory distances among the fields from memory addresses of the fields. For example, analysis apparatus 102 may calculate the memory distance between two fields as the difference in the fields' memory addresses.

If one or more of the memory distances exceeds a threshold, analysis apparatus 102 may identify the execution unit as having a suboptimal memory layout. Analysis apparatus 102 may then calculate a score representing the memory distances in the memory layout and order execution units with suboptimal memory layouts by score.

Presentation apparatus 106 may also display a list of the ordered execution units and/or visualizations (e.g., visualizations 124-126) of the suboptimal memory layouts of the execution units. For example, each visualization may include a center representing a memory address of a selected field in the memory layout, as well as a number of fields in one or more regions around the center. Each region may represent a relative distance in memory address from the center. As a result, the visualization may be used to discover fields that are relatively far from other fields in the execution unit, which may negatively impact execution of software program 110 within the execution unit. In turn, a user may reduce the memory distances in the execution unit and improve the memory usage and/or execution of software program 110 by specifying one or more rules for grouping the fields in the execution unit using the techniques described above. Identifying and visualizing suboptimal memory layouts in software programs is described in further detail below with respect to FIG. 2C.

Those skilled in the art will appreciate that the system of FIG. 1 may be implemented in a variety of ways. First, analysis apparatus 102, software program 110, and presentation apparatus 106 may execute within a single physical machine, multiple computer systems, one or more virtual machines (e.g., JVMs), a grid, and/or a cloud computing system. For example, the same or different virtual machine instances, threads, processes, computers, and/or applications may be used to generate memory layouts 120-122 from rules 116-118, display visualizations 124-126, obtain user input 128-130 for creating rules 116-118, and/or execute software program 110. In addition, analysis apparatus 102 and presentation apparatus 106 may be implemented together and/or separately by one or more hardware and/or software components and/or layers.

Second, analysis apparatus 102 and presentation apparatus 106 may be configured to provide memory layouts 120-122, visualizations 124-126, and/or rules 116-118 for a variety of development and/or execution environments. As described above and in the above-referenced application, analysis apparatus 102 may enable the generation of memory layouts 120-122 associated with a number of possible execution contexts. The execution contexts may also include non-virtualized execution contexts, such as native execution of software program 110 on a given platform, operating system, and/or set of hardware instead of a virtual machine. Along the same lines, analysis apparatus 102 and presentation apparatus 106 may be configured to provide memory layouts 120-122, visualizations 124-126, and/or rules 116-118 for software programs developed using a variety of programming languages and/or software development kits (SDKs). Finally, rules 116-118 may be obtained from a number of sources, including GUIs, command-line interfaces (CLIs), binary files, and/or configuration files.

Figure 2A:
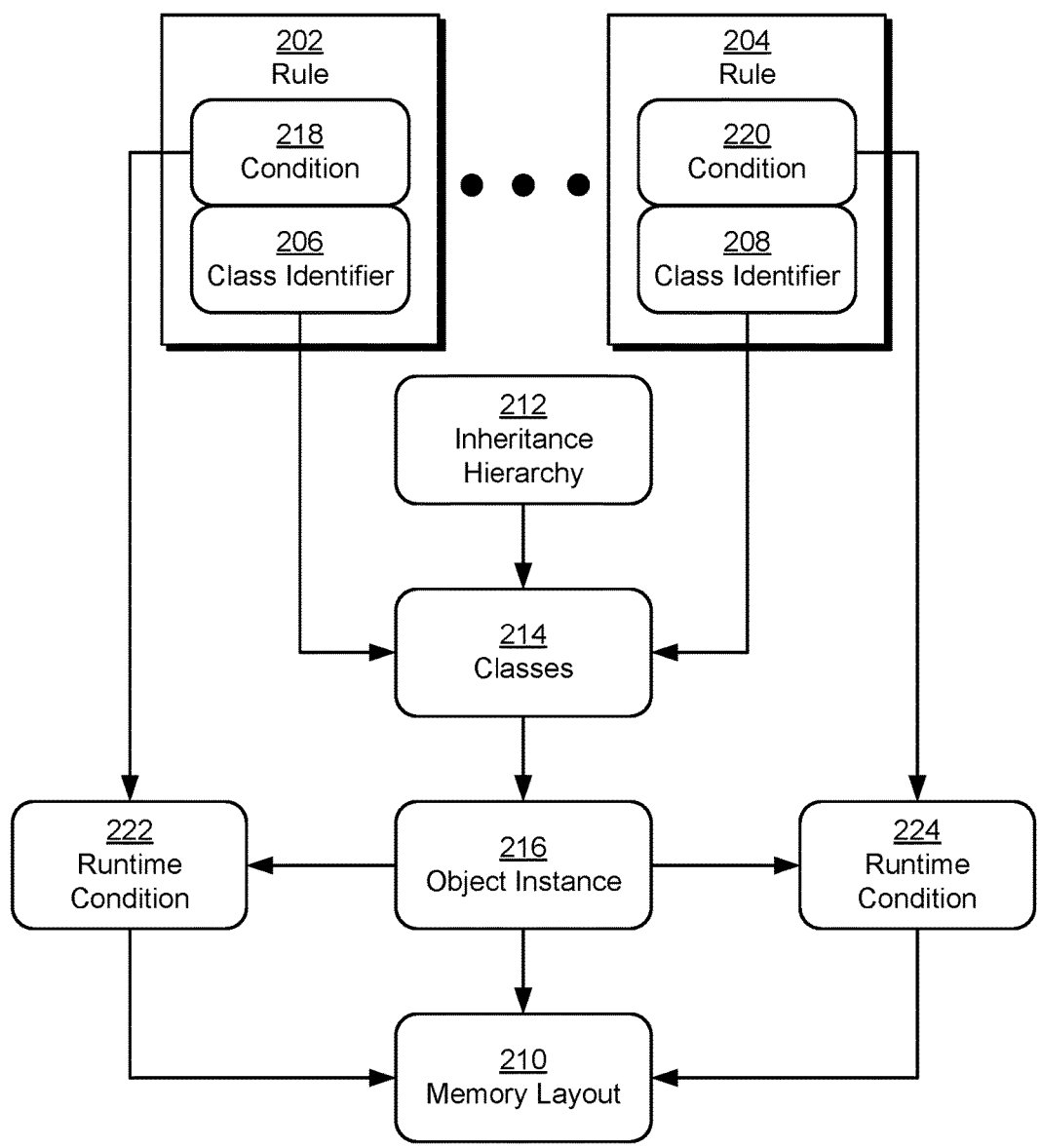
FIG. 2A shows the generation of a memory layout of an object instance in a software program in accordance with the disclosed embodiments.

FIG. 2A shows the generation of a memory layout 210 of an object instance 216 in a software program (e.g., software program 110 of FIG. 1) in accordance with the disclosed embodiments. As described above, memory layout 210 may be generated using a set of rules 202-204. Each rule may define an ordering, grouping, and/or other arrangement of fields in object instance 216.

To determine the relevance of rules 202-204 to object instance 216, class identifiers 206-208 in rules 202-204 may be matched to class names of classes 214 in an inheritance hierarchy 212 of object instance. Inheritance hierarchy 212 may trace one or more levels of inheritance from the class from which object instance 216 is created to a topmost parent class inherited by all other classes 214 in inheritance hierarchy 212.

If a given rule has a class identifier that matches a class name of a class in inheritance hierarchy 212, the rule may be associated with object instance 216. For example, all rules 202-204 with class identifiers 206-208 that match classes 214 in inheritance hierarchy 212 may be considered for use in generating memory layout 210, while other rules with class identifiers that do not match classes 214 in inheritance hierarchy 212 may be omitted from use in generating memory layout 210. Within rules 202-204, a rule with a class identifier of a subclass in inheritance hierarchy 212 may take precedence over a rule with a class identifier of a parent class in inheritance hierarchy 212 that is applied to one or more of the same fields. For example, object instance 216 may be created from a class "A" that inherits a class "B." During creation of a memory layout of object instance 216, one or more rules that specify class "A" and fields from class "B" may take precedence over one or more rules that specify class "B" and the same fields. Conversely, if no rules that specify class "A" exist, the memory layout may be created from rules that specify class "B" and/or parent classes of class "B."

Those skilled in the art will appreciate that rules may be assigned to other groupings of classes in the software program. For example, one or more rules may identify a group of classes as a package, module, library, development branch, software program, and/or custom set of class names. In turn, the rules may be applied to object instances associated with the identified group of classes. For example, a rule associated with a custom set of classes may import fields from any of the classes in the set and order and/or group the imported fields in an arbitrary way.

After an association between rules 202-204 and object instance 216 is identified, rules 202-204 may be applied to one or more fields of object instance 216 to generate memory layout 210. For example, rules 202-204 may be used to identify fields in inheritance hierarchy 212, define groups of the fields, order fields within the groups, and/or order groups within memory layout 210. As a result, rules 202-204 may override default and/or global layout rules associated with the platform and/or execution context of the software program, such as rules for grouping fields from a class separately from fields from a parent class of the class and/or rules for ordering the fields of all object instances by field size and/or field type. Conversely, if one or more fields of object instance 216 are not specified in rules 202-204, the fields may be included in memory layout 210 according to default rules associated with the platform and/or execution context.

Selective application of rules 202-204 to memory layout 210 may additionally be enforced through optional conditions 218-220 in rules 202-204. Conditions 218-220 may identify states of the software program that must be matched to runtime conditions 222-224 associated with object instance 216 and/or the software program before the corresponding rules 202-204 are applied. For example, conditions 218-220 may include timing conditions, levels of memory usage, levels of processor usage, events, identities (e.g., user identities, developer identities, etc.), and/or thresholds (e.g., values to be met) associated with execution of the software program. If a rule does not specify a condition, the rule may be applied during initialization of the software program.

For example, rules 202-204 associated with object instance 216 may include the following text-based representation:

```
class Foo extends Bar {
    @grp1[f1, f7, Bar.b2], [f2, f6, Bar.b1]
}
class Bar {
    // Follows the class fields declaration order.
} if (USAGE.HIGH)
class Bar {
    [b1, b2]
} if (USAGE.LOW)
```

In the above example, three rules are defined. The first rule may include a class name of "Foo," as well as the class name of "Bar," which represents a parent class of "Foo." Next, the first rule may specify two groupings of fields from both classes: a first grouping named "grp1" with fields "f1" and "f7" from "Foo" and field "b2" from "Bar," and a second unnamed grouping with fields "f2" and "f6" from "Foo" and field "b1" from "Bar." The second and third rules may include a class name of "Bar;" the second rule may lack a grouping or field names but specify a condition (e.g., "USAGE.HIGH"), and the third rule may include an unnamed grouping of fields "b1" and "b2" from "Bar" and a different condition (e.g., "USAGE.LOW").

The first rule may be used to generate a memory layout for an object instance created from "Foo" so that fields "f1," "f7," and "Bar.b2" are collocated (e.g., placed as near to one another as possible) and fields "f2," "f6," and "Bar.b1" are collocated. Within the rule, the ordering of fields within each group may or may not affect the layout of the corresponding collocated fields. Similarly, the ordering of the two groups in the rule may or may not affect the placement of the groups in the memory layout.

The second and third rules may be applied to instances of class "Bar" but not instances of class "Foo," which inherit "Bar" but are laid out according to the first rule. The second rule may be an "empty" rule that indicates that the declaration order of fields in the source code for the "Bar" class is to be used in the memory layout of the fields when the memory usage of the software program is high. The third rule may indicate that the "b1" and "b2" fields of the "Bar" class are to be collocated in the memory layout when the memory usage of the software program is low. Because the memory usage of the software program cannot be simultaneously low and high, only one of the second or third rules may be applied at a given time during execution of the software program.

Figure 2B:
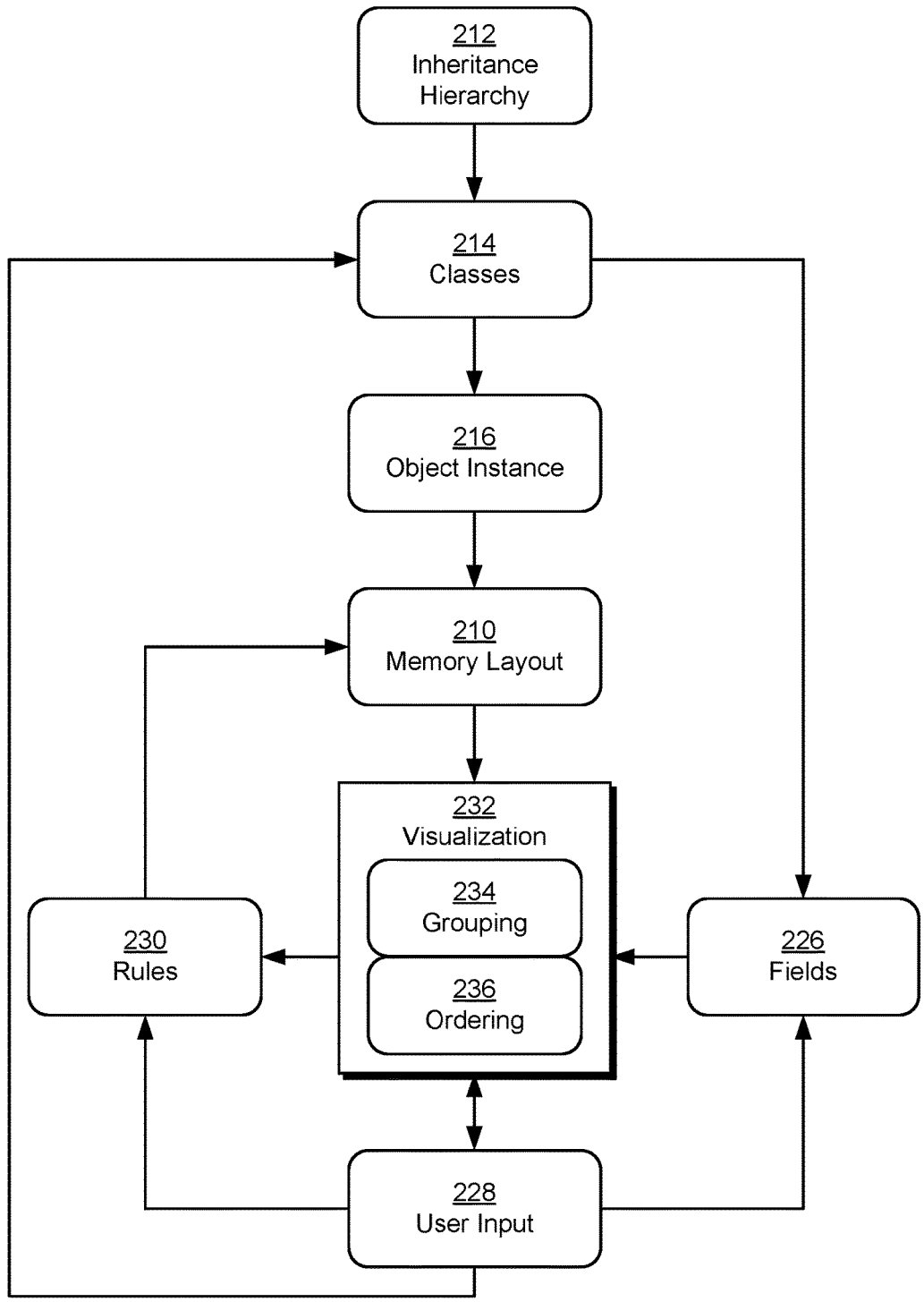
FIG. 2B shows the graphical editing of memory layout rules for an object instance in a software program in accordance with the disclosed embodiments.

FIG. 2B shows the graphical editing of memory layout rules 230 for object instance 216 in a software program in accordance with the disclosed embodiments. As mentioned above, object instance 216 may be created from a set of classes 214 in inheritance hierarchy 212. As a result, memory layout 210 of object instance 216 may include a set of fields 226 from classes 214.

To facilitate the creation of rules 230 for configuring memory layout 210, a visualization 232 of memory layout 210 may be displayed, and visualization 232 and rules 230 may be updated based on user input 228 from a user such as a developer of the software program. For example, a GUI may be used to display visualization 232 and obtain user input 228 for updating visualization 232 and creating rules 230. Rules 230 created through the GUI may then be exported to a configuration file, binary file, and/or other representation for subsequent use in configuring memory layout 210 during runtime of the software program, as described above.

In particular, user input 228 may be used to select one or more fields 226 from classes 214 associated with inheritance hierarchy 212 of object instance 216. For example, the user may select one or more classes 214 used to create object instance 216 from a list of class names in the GUI. In response to the selection, the GUI may display another list of fields associated with inheritance hierarchy 212 of object instance 216, and the user may select one or more fields 226 for inclusion in visualization 232 and/or rules 230.

The selected fields 226 may then be displayed in visualization 232, and additional user input 228 may be used to perform grouping 234 of fields 226 and/or ordering 236 of fields 226, groups of fields 226, and/or rules 230. Grouping 234 and/or ordering 236 associated with fields 226 from visualization 232 may then be included in rules 230 for generating memory layout 210.

As mentioned above, rules 230 may be applied to other groups of classes (e.g., packages, modules, software programs, development branches, custom sets, etc.). To create such rules 230 using visualization 232, the user may provide user input 228 identifying the groups of classes to which the rules are to be applied, then select fields in the classes for inclusion in visualization 232. The user may then manipulate representations of the selected fields within visualization 232 to create and validate rules 230 for configuring the memory layouts of the classes. After rules 230 are created, rules 230 may be applied to the fields to customize the memory layouts. For example, rules 230 may be used to collocate and/or order fields from classes in different inheritance hierarchies, packages, and/or modules. Because such rules 230 do not have a natural precedence that is based on inheritance hierarchy 212 and/or another inherent ordering in the software program, rules 230 may be manually ordered within visualization 232 and/or the GUI to specify an order of precedence for rules 230.

Figure 2C:
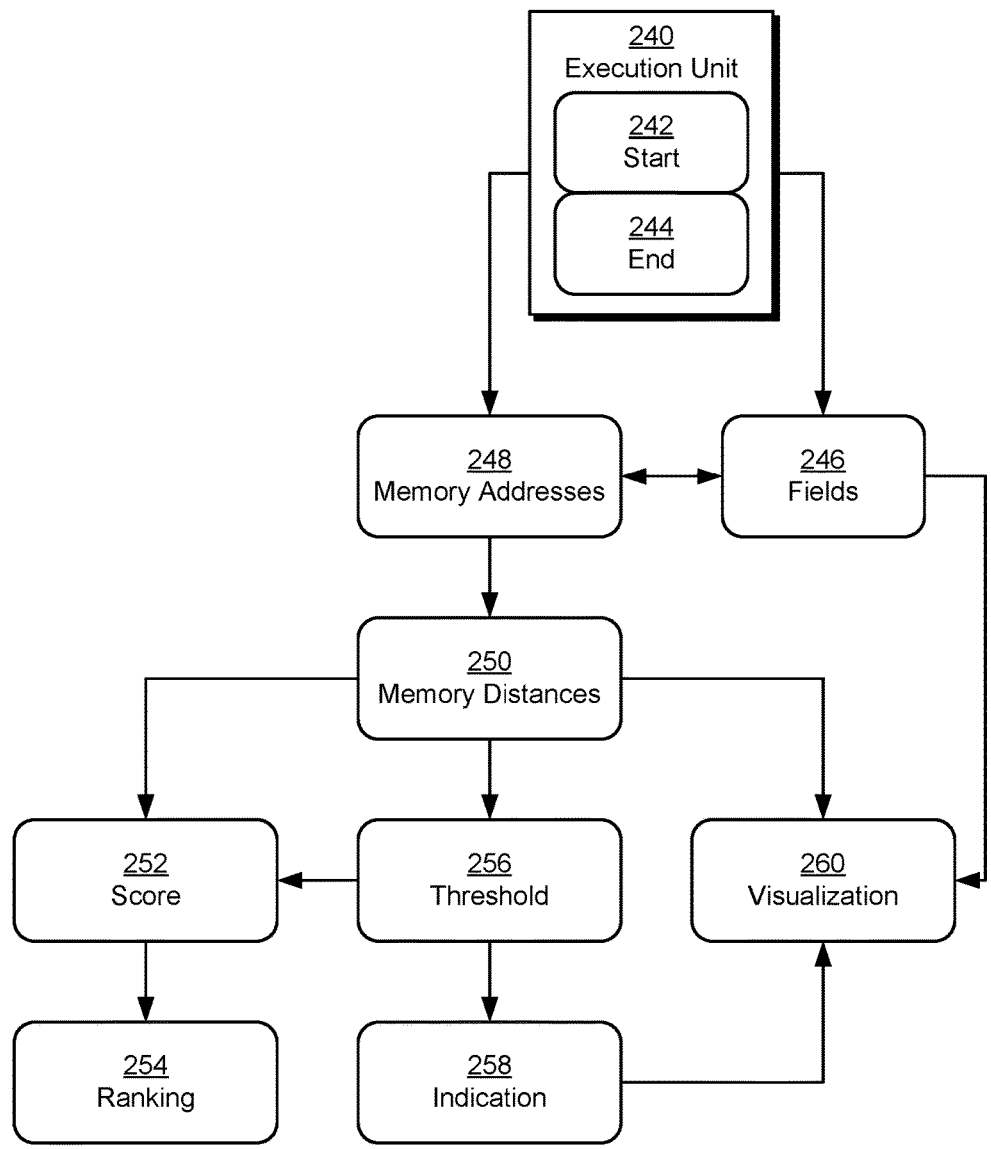
FIG. 2C shows the identification of a suboptimal memory layout in a software program in accordance with the disclosed embodiments.

FIG. 2C shows the identification of a suboptimal memory layout (e.g., memory layout 210) in a software program in accordance with the disclosed embodiments. The suboptimal memory layout may include fields that are relatively far apart in memory, which increases the time required to access the fields during execution of the software program. Existing tooling for solving performance issues involve monitoring software program execution to determine metrics associated with the program execution and using the metrics to identify methods at which more execution time is spent. The methods may then be used to retrieve the associated classes and object instances. However, such information cannot be used to determine if the memory layouts of the object instances are causing the increased execution time.

To facilitate performance improvements through the creation and application of rules for customizing memory layouts described above, suboptimal memory layouts that potentially slow execution of the software program (e.g., memory layouts that require longer access times) may be identified and displayed. As shown in FIG. 1, a suboptimal memory layout may be based on an execution unit 240 in the software program, which includes a start 242 and an end 244. Execution unit 240 may represent a "use case" within the software program. For example, execution unit 240 may encompass all execution used to perform a "save file" action in the software program.

A number of techniques may be used to identify start 242 and end 244. For example, threads in the software program may be instrumented to detect thread start and thread end events, which mark the execution boundaries (e.g., starts and ends) of the execution units represented by the threads. In another example, start 242 may be obtained as an entry point of execution from a user (e.g., by annotating a method representing the entry point). In turn, end 244 may be a duration of time (e.g., a number of milliseconds) after start 242 and/or a completion of execution associated with the entry point (e.g., completed execution of the annotated method).

After execution unit 240 is identified and/or defined, a set of fields 246 accessed within execution unit 240 is identified. For example, a runtime environment of the software program may be used to track all memory addresses 248 accessed during execution unit 240 and map memory addresses 248 to fields 246.

Next, memory addresses 248 are used to calculate one or more memory distances 250 among fields 246. Each memory distance may represent the difference in memory addresses 248 of a pair of fields in execution unit 240. Because memory addresses 248 of fields 246 may move during runtime (e.g., as a result of garbage collection), memory distances 250 may be calculated using the "average" memory addresses 248 of fields 246 within execution unit 240. Conversely, frequent changes in memory addresses 248 of fields 246 within execution unit 240 may be averted by defining execution unit 240 so that object instances containing fields 246 in execution unit 240 are in use from start 242 to end 244, thus minimizing movement of the object instances.

Memory distances 250 may then be compared to a threshold 256 to determine if execution unit 240 is associated with a suboptimal memory layout. Threshold 256 may represent a memory size that is associated with optimized execution of execution unit 240. For example, threshold 256 may be associated with the size of a processor cache line and/or associative cache in the computer system on which the software program executes to ensure that execution unit 240 can run from the processor cache. It should be noted that if the memory distance between two particular fields is small enough to allow both fields to fit within a processor cache line, the throughput of the software program may be higher because the two fields may be retrieved together. If all memory distances 250 fall within threshold 256, a suboptimal memory layout is not found, and no additional processing associated with execution unit 240 may be required.

However, if one or more memory distances 250 exceed threshold 256, a suboptimal memory layout may be found in execution unit 240, and an indication 258 of the suboptimal memory layout is generated and/or stored. For example, indication 258 may be generated by adding execution unit 240 to a list of execution units with suboptimal memory layouts.

Next, a score 252 for execution unit 240 is calculated from memory distances 250. For example, each memory distance in execution unit 240 may be assigned a score, with a higher score representing a lower memory distance. The scores for memory distances 250 may then be averaged into an overall score 252 for execution unit 240. Score 252 may then be used to generate a ranking 254 of execution units with suboptimal memory layouts. For example, ranking 254 may order the execution units by increasing score 252 so that execution units with the most suboptimal memory layouts (e.g., greatest memory distances) are ranked higher than execution units with less suboptimal memory layouts. In turn, ranking 254 may be used to prioritize the rule-based configuration of memory layouts for the execution units using the techniques described above.

To further assist with configuring the memory layout in a more optimal way, a visualization 260 of the suboptimal memory layout is displayed. For example, visualization 260 may include concentric circles that are analogous to rings in a shooting target. The center of the target may represent a memory address of a selected field in execution unit 240. Representations of other fields 246 may then be placed in the target so that fields with memory addresses that are close to the selected field are near the center and fields with memory addresses that are farther from the selected field are in one or more outer rings of the target. Because visualization 260 may be used to identify fields that adversely affect the memory layout of execution unit 240, visualization 260 may facilitate the creation of rules for configuring the memory layout in a way that improves the memory layout (e.g., by moving the fields closer to other fields in execution unit 240).

Figure 3A:
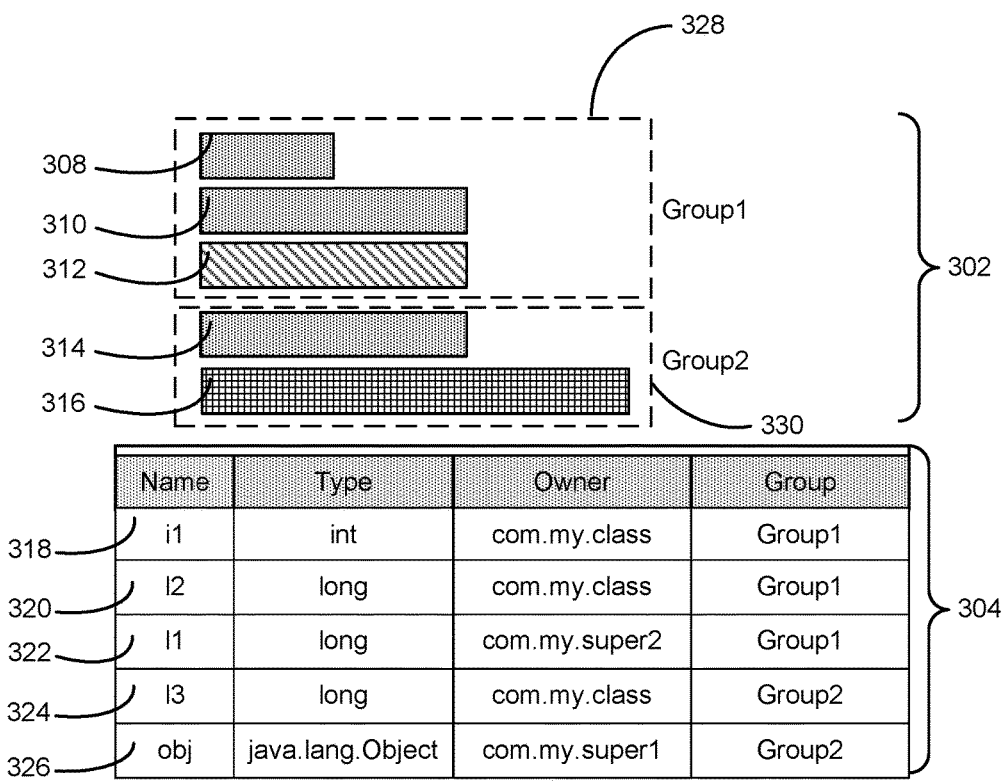
FIG. 3A shows an exemplary screenshot in accordance with the disclosed embodiments.

FIG. 3A shows an exemplary screenshot in accordance with the disclosed embodiments. More specifically, FIG. 3A shows a screenshot of a GUI provided by a presentation apparatus, such as presentation apparatus 106 of FIG. 1. For example, the presentation apparatus may form part of a tool that is used to view, manage, and/or improve the memory consumption of a software program, such as software program 110 of FIG. 1.

As shown in FIG. 3A, the GUI includes a visualization 302 of a memory layout of an object instance in the software program. Visualization 302 may include a set of representations 308-316 of fields in the memory layout. For example, each field may be represented by a rectangle in visualization 302. Characteristics of the fields may be reflected in the appearance of representations 308-316. First, the length of each rectangle may denote the relative size of the corresponding field. As a result, representation 316 may be associated with the largest field, representations 310-314 may be associated with smaller fields of roughly the same size, and representation 308 may be associated with the smallest field.

Second, differences in the shading of representations 308-316 may represent the ownership of the corresponding fields by different classes in the inheritance hierarchy of the object instance and/or a group of classes from which the fields were imported. For example, the similar shading of representations 308, 310 and 314 may indicate that the corresponding fields are from the same class, while the unique shading of representations 312 and 316 may indicate that the corresponding fields are from two other classes. As a result, fields in the memory layout may be obtained from three separate classes.

A user may interact with visualization 302 to specify one or more rules for generating the memory layout. For example, the user may use one or more editing tools to define two groupings 328-330 of the fields, which are represented by dashed lines in visualization 302. Grouping 328 may include representations 308-312 and have a name of "Group1," and grouping 330 may include representations 314-316 and have a name of "Group2." Groupings 328-330 may be used to generate rules that are used to collocate fields corresponding to representations 308-312 and 314-316, respectively, within the memory layout. The order of representations 308-316 in each grouping and/or the order of groupings 328-330 in visualization 302 may optionally be used to generate additional rules for ordering the fields within groupings 328-330 and ordering groupings 328-330 within the memory layout.

The GUI also includes a table 304 of information related to the fields. Each row 318-326 in table 304 may include data for a given field in the memory layout. For example, table 304 may identify names, types, owners (e.g., class names), and groupings 328-330 of fields associated with representations 308-316. Row 318 may have a name of "i1," a type of "int," an owner of "com.my.class," and a grouping of "Group1." Row 320 may have a name of "l2," a type of "long," an owner of "com.my.class," and a grouping of "Group1." Row 322 may have a name of "l1," a type of "long," an owner of "com.my.super2," and a grouping of "Group1." As a result, rows 318-322 may correspond to representations 308-312; a smaller field size associated with the "int" type in row 318 may be indicated by the shorter rectangle in representation 308, and an ownership of the "l1" field in row 322 by a different class may be indicated by a different shading of representation 312.

Row 324 may have a name of "l3," a type of "long," an owner of "com.my.class," and a grouping of "Group2." Row 326 may have a name of "obj," a type of "java.lang.Object," an owner of "com.my.super1," and a grouping of "Group2." Thus, rows 324-326 may correspond to representations 314-316. An ownership of the "l3" field in row 324 by the same class as that of the "i1" and "l2" types in rows 318-320 may be indicated by the same shading in representations 308, 310 and 314, and a large field size of the "java.lang.Object" type in row 326 may be reflected in the length of representation 316.

Figure 3B:
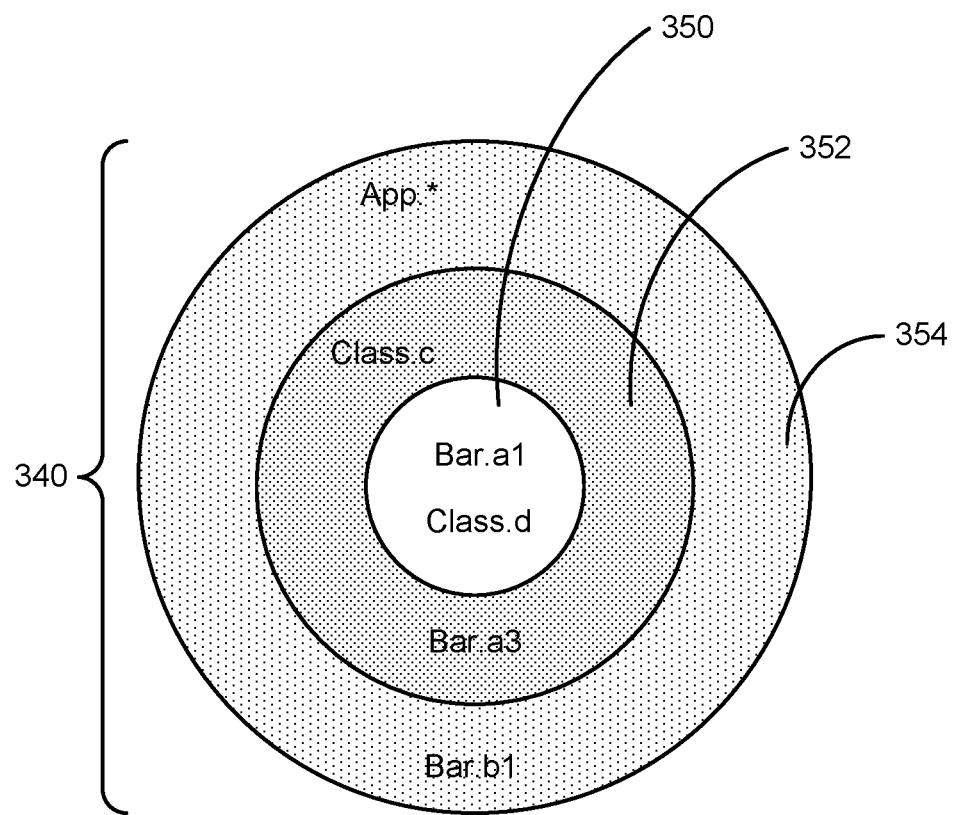
FIG. 3B shows an exemplary screenshot in accordance with the disclosed embodiments.

FIG. 3B shows an exemplary screenshot in accordance with the disclosed embodiments. Like the screenshot of FIG. 3A, FIG. 3B shows a screenshot of a GUI provided by a presentation apparatus, such as presentation apparatus 106 of FIG. 1.

The GUI of FIG. 3B also includes a visualization 340 of a memory layout. Unlike visualization 302 of FIG. 3A, visualization 340 may provide information related to a suboptimal memory layout of an execution unit, which may include one or more object instances. In particular, visualization 340 includes a number of concentric rings 350-354 within which names of fields in the execution unit are placed. Fields "Bar.a1" and "Class.d" are in the center ring 350, fields "Class.c" and "Bar.a3" are in the middle ring 352, and fields "App.*" (e.g., all fields in the "App" class) and "Bar.b1" are in the outermost ring 354.

In other words, visualization 340 may form a "target," with the placement of field names inside rings 350-354 representing the distances of the corresponding fields from a memory address selected as the center of the target. The center of the target may be set to any field accessed within the execution unit. For example, the center may be chosen as the most frequently accessed field and/or the field with the lowest memory distances to other fields in the execution unit. Alternatively, the center of the target may be set to a memory address that is not strictly associated with a field, such as a memory address that is midway from the lowest and highest memory addresses accessed in the execution unit.

Once the center is selected, classes that are at or close to the center (e.g., "Bar.a1," "Class.d") may be placed in the innermost ring 350. Classes that are a moderate memory distance from the center (e.g., "Class.c," "Bar.a3") may be placed in the middle ring 352. Finally, classes that have a memory distance that exceeds a threshold for an optimal memory layout (e.g., "App.*", "Bar.b1") may be placed in the outermost ring 354.

The scale of the target may also reflect the memory distances of the fields from the center. For example, the radius of the target may represent the memory distance between the center and the farthest field from the center in the execution unit, and the thickness of rings 350-354 and/or the location of field names in the target may be determined relative to the memory distance.

A score may also be calculated for the execution unit based on the memory distances of the fields from the center. For example, a score may be assigned to each field to be inversely proportional to the memory distance of the field from the center:

Bar.a1: 10
Class.d: 10
Bar.a3: 5
Class.c: 5
Bar.b1: 0
App.* (three fields): 3*0

The field scores may then be averaged into an overall score for the execution unit, or 30/8 (e.g., 3.75). The overall score and/or presence of fields in the outermost ring 354 may thus indicate that the memory layout is suboptimal.

At the same time, information in visualization 340 may be used to define one or more rules that improve the memory layout of the execution unit. For example, a user may use visualization 340 to identify "App.*" and 'Bar.b1" as fields that adversely impact the memory layout. As a result, the user may create one or more rules for moving "App.*" and "Bar.b1" closer to the center of the target, such as rules for grouping "App.*" and "Bar.b1" with "Bar.a1" and/or "Class.d." After the rules are created, the user may use visualization 340 to assess the effect of the rules on the memory layout. For example, the user may determine that the rules have resulted in an optimal memory layout when visualization 340 subsequently indicates that "App.*" and "Bar.b1" have moved to the center ring 350 and no fields are in the outermost ring 354.

Figure 4:
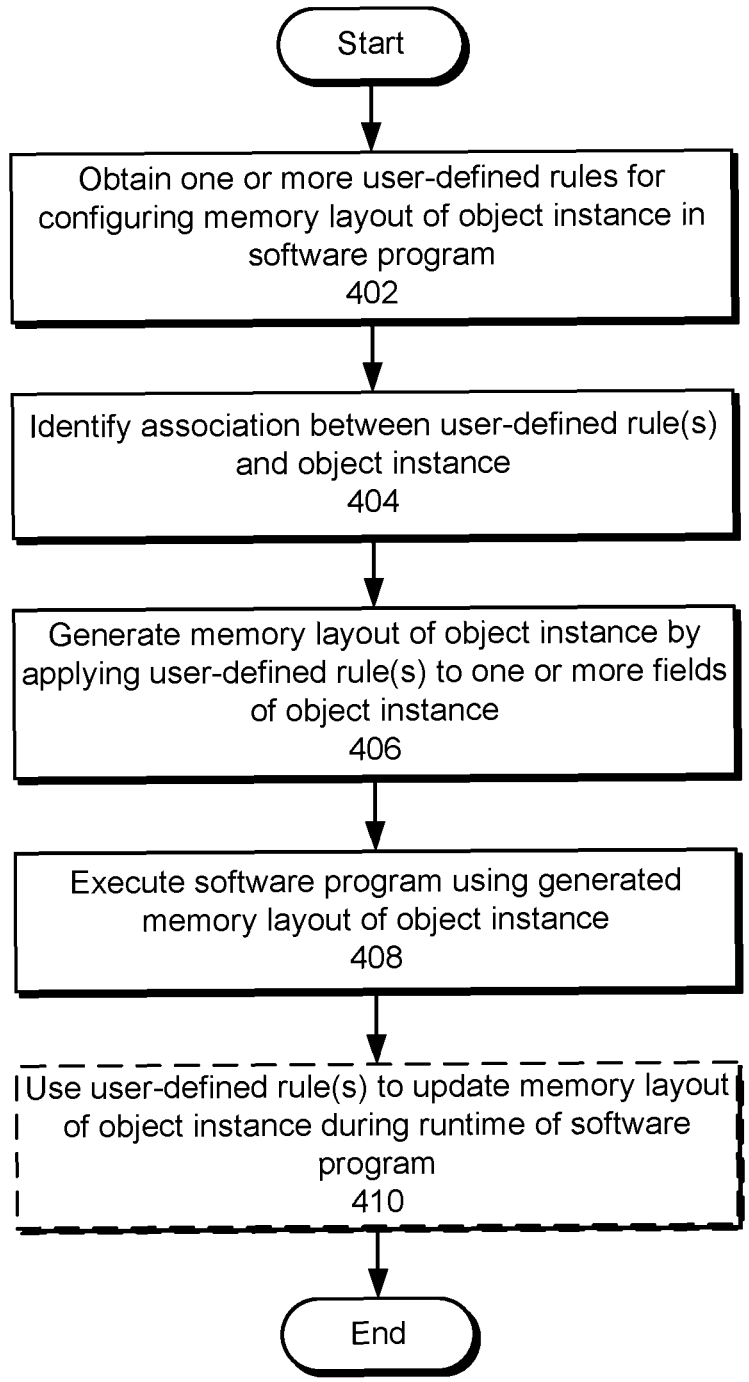
FIG. 4 shows a flowchart illustrating the process of configuring a memory layout for an object instance in a software program in accordance with the disclosed embodiments.

FIG. 4 shows a flowchart illustrating the process of configuring a memory layout for an object instance in a software program in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, one or more user-defined rules for configuring the memory layout of the object instance are obtained (operation 402). The rules may be created separately from source code for the software program. For example, the rules may be obtained from a configuration file that is created by a graphical editor, as discussed below with respect to FIG. 5.

Next, an association between the user-defined rule(s) and the object instance is identified (operation 404). The association may be identified by matching a class identifier in the user-defined rule(s) to a class name of a class from which the object instance is created and/or a class name of a parent class of the class. For example, if the class identifier cannot be matched to the class, the class identifier may be matched to the parent class. In other words, the association may be based on an inheritance hierarchy of the object instance, with rules for subclasses in the inheritance hierarchy taking precedence over rules for superclasses in the inheritance hierarchy that affect the same fields.

A memory layout of the object instance is then generated by applying the user-defined rule(s) to one or more fields of the object instance (operation 406), and the software program is executed using the generated memory layout of the object instance (operation 408). For example, the rule(s) may be used to group and/or order the fields within the memory layout, which may improve the memory usage and/or speed of the software program when executed with the memory layout.

Finally, the user-defined rule(s) are optionally used to update the memory layout during runtime of the software program (operation 410). For example, the memory layout may be updated during runtime by obtaining a condition from a rule and applying the rule to the memory layout when the condition matches a runtime condition of the software program. The condition may specify a timing condition, a memory usage, a processor usage, an event, an identity, and/or a threshold to be met by the runtime condition.

Figure 5:
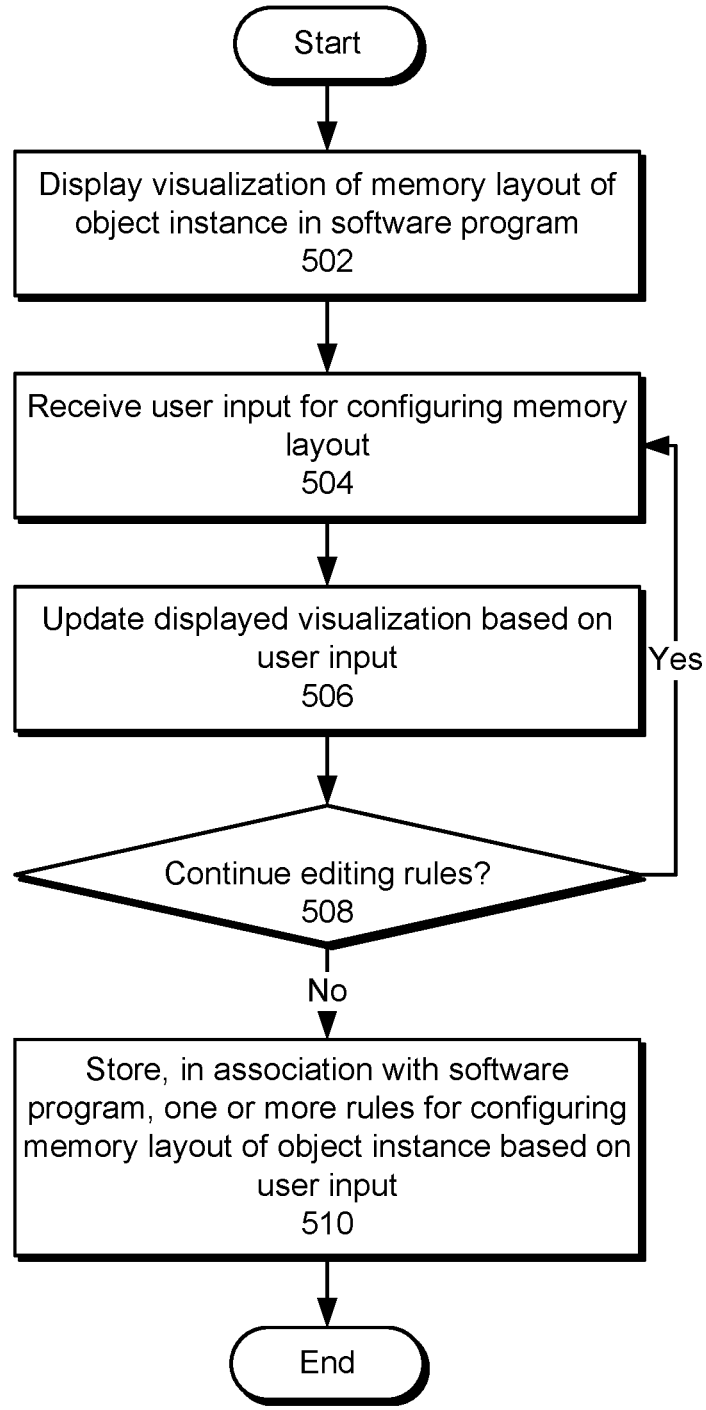
FIG. 5 shows a flowchart illustrating the process of graphically configuring a memory layout for an object instance in a software program in accordance with the disclosed embodiments.

FIG. 5 shows a flowchart illustrating the process of graphically configuring a memory layout for an object instance in a software program in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a visualization of a memory layout of an object instance in a software program is displayed (operation 502). For example, the visualization may be displayed within a GUI. The visualization may include graphical distinctions among the sizes of fields in the object instance and/or fields from different classes in the inheritance hierarchy of the object instance.

Next, user input for configuring the memory layout is received (operation 504), and the displayed visualization is updated based on the user input (operation 506). The user input may include a user selection of the object instance and/or other object instances, as well as user selections of fields from classes used to create the object instance(s). After the visualization is displayed, the user input may be used to group fields in the memory layout, order fields in the memory layout, and/or order one or more rules to be created based on the user input.

Editing of the rules may continue (operation 508) using the visualization. If the rules are to be edited, user input for configuring the memory layout is received (operation 504), and the displayed visualization is updated based on the user input (operation 506). After editing of the rules is complete, the rule(s) for configuring the memory layout of the object instance are stored in association with the software program based on the user input (operation 510). For example, groupings and/or orderings of fields and/or rules in the visualization may be converted into one or more rules to be applied to the object instance. The rules may then be used to generate and/or update the memory layout of the object instance during execution of the software program, as described above.

Figure 6:
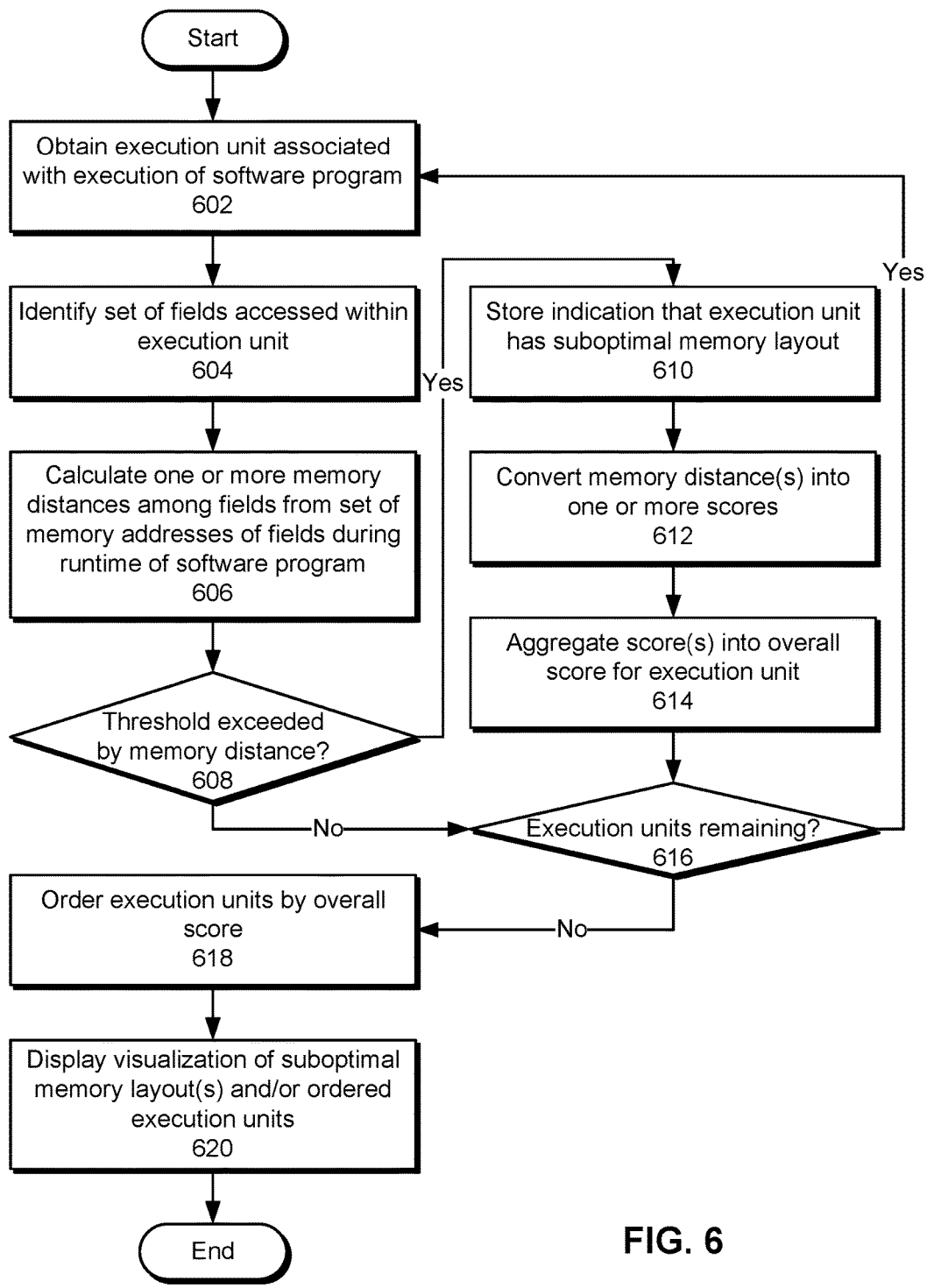
FIG. 6 shows a flowchart illustrating the process of analyzing a memory layout of an execution unit in a software program in accordance with the disclosed embodiments.

FIG. 6 shows a flowchart illustrating the process of analyzing a memory layout of an execution unit in a software program in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

Initially, an execution unit associated with execution of the software program is obtained (operation 602). The execution unit may be represented by a start and an end. For example, the start and end may be represented by a thread start event and a thread end event. In another example, the start may be obtained from a user (e.g., as an annotated method), and the end may include a duration of time after the start and/or a completion of execution associated with the start (e.g., completed execution of the annotated method).

Next, a set of fields accessed within the execution unit is identified (operation 604). For example, a runtime environment may be used to track memory addresses accessed within the execution unit and map the memory addresses to the fields. One or more memory distances among the fields are then calculated from the memory addresses during runtime of the software program (operation 606). Each memory distance may represent a difference in memory address between two accessed fields in the execution unit.

A calculated memory distance may exceed a threshold (operation 608). For example, a memory distance between two fields may exceed a threshold associated with a cache line of a processor cache in the computer system on which the software program executes. If the threshold is not exceeded by any of the memory distances, no additional analysis of the memory distances is required.

If the threshold is exceeded by one or more of the memory distances, an indication that the execution unit has a suboptimal layout is stored (operation 610). Next, the memory distance(s) are converted into one or more scores (operation 612), and the score(s) are aggregated into an overall score for the execution unit (operation 614). For example, a score may be assigned to each field based on the field's memory distances to other fields in the execution unit. The scores for all fields in the execution unit may then be averaged into the overall score.

Suboptimal memory layouts may be identified in remaining execution units (operation 616) in the software program. If other execution units are to be analyzed, each execution unit is obtained (operation 602), and a set of fields accessed within the execution is identified (operation 604). One or more memory distances among the fields is then calculated (operation 606) and compared to a threshold (operation 608). If the threshold is not exceeded, the execution unit may not be associated with a suboptimal memory layout. If the threshold is exceeded, an indication of a suboptimal memory layout in the execution unit is stored (operation 610), and an overall score for the execution unit is calculated (operations 612-614).

After overall scores have been calculated for all defined execution units with suboptimal memory layouts in the software program, the execution units are ordered by overall score (operation 618). For example, the execution units may be ordered by increasing overall score to prioritize the creation of rules for improving the memory layouts of the execution units. Finally, a visualization of one or more suboptimal memory layouts and/or the ordered execution units is displayed (operation 620). For example, the ordered execution units may be displayed in a list. After an execution unit in the list is selected, a visualization of the execution unit's memory layout may be shown. The visualization may represent a shooting target, with fields placed in the target based on the fields' memory distances. Fields that are farthest from the center of the target may thus represent candidates for inclusion in one or more rules for configuring the memory layout in a more optimal way.

Figure 7:
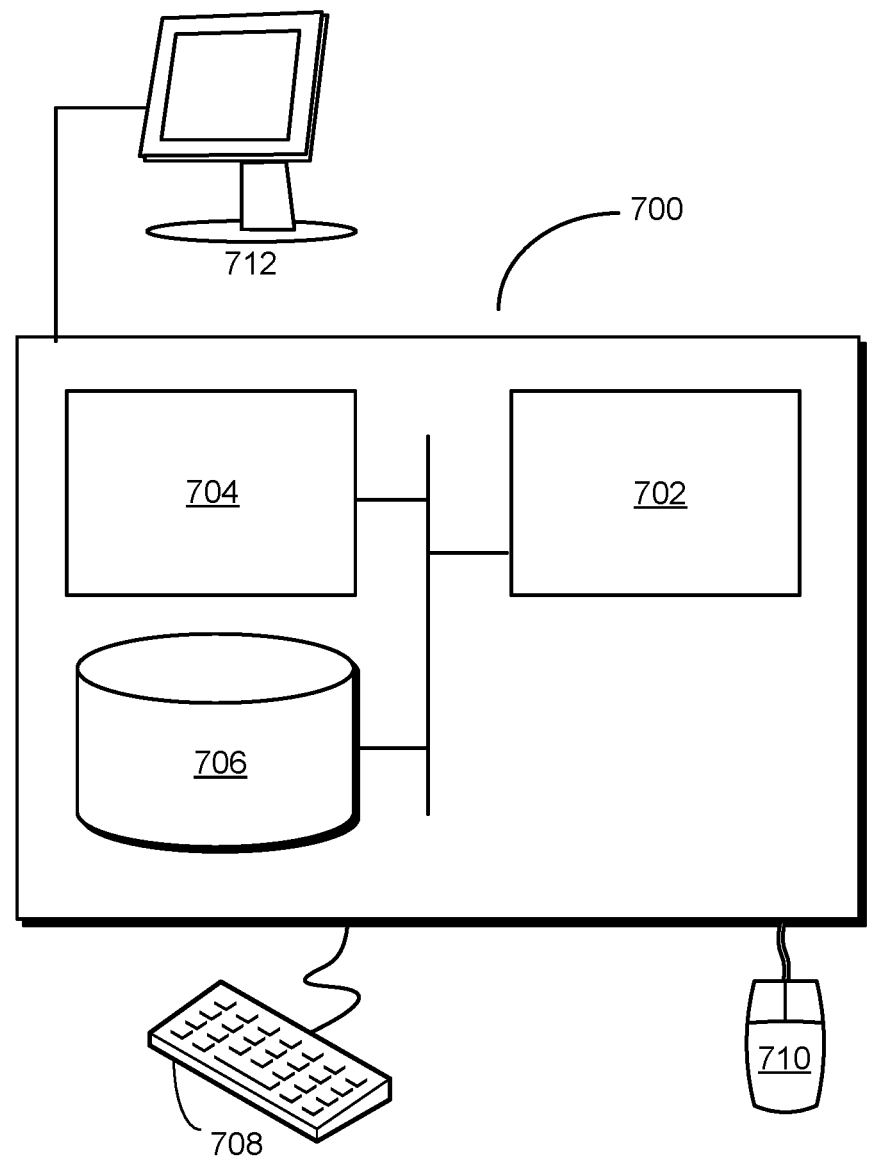
FIG. 7 shows a computer system in accordance with the disclosed embodiments.

FIG. 7 shows a computer system 700 in accordance with an embodiment. Computer system 700 may correspond to an apparatus that includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for facilitating the execution of a software program. The system may include an analysis apparatus that obtains one or more user-defined rules for configuring a memory layout of an object instance in a software program. Next, the analysis apparatus may generate the memory layout of the object instance by applying the one or more user-defined rules to one or more fields of the object instance. The analysis apparatus may then execute the software program using the generated memory layout of the object instance.

The system may also include a presentation apparatus that displays a visualization of a memory layout of an object instance in a software program and receives user input for configuring the memory layout. Next, the presentation apparatus may update the displayed visualization based on the user input and store, in association with the software program, one or more rules for configuring the memory layout of the object instance based on the user input.

The analysis apparatus and presentation apparatus may also obtain an execution unit associated with execution of a software program. Next, the analysis apparatus and presentation apparatus may identify a set of fields accessed within the execution unit and calculate one or more memory distances among the set of fields from a set of memory addresses of the set of fields during runtime of the software program on the computer system. When at least one of the memory distances exceeds a threshold, the analysis apparatus and presentation apparatus may store an indication that the execution unit has a suboptimal memory layout and/or display a visualization of the suboptimal memory layout.

In addition, one or more components of computer system 700 may be remotely located and connected to the other components over a network. Portions of the present embodiments (e.g., analysis apparatus, presentation apparatus, software program, etc.) may also be located on different nodes of a distributed system that implements the embodiments. For example, the present embodiments may be implemented using a cloud computing system that improves the knowledge and management of memory consumption in a set of remote software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
  obtaining an execution unit associated with execution of a software program, wherein the execution unit comprises a start and an end;
  identifying, by a computer system, a set of fields accessed within the execution unit;
  calculating, by the computer system, one or more memory distances among the set of fields from a set of memory addresses of the set of fields during runtime of the software program on the computer system, wherein the memory addresses of the set of fields move during runtime, and wherein the one or more memory distances comprise a difference in average memory address between a first field and a second field in the set of fields;
  based at least in part on a memory distance in the one or more memory distances exceeding a threshold, storing an indication that the execution unit has a suboptimal memory layout;
  converting the one or more memory distances into one or more scores;
  aggregating the one or more scores into an overall score for the execution unit;
  ordering the execution unit with one or more additional execution units in the software program by the overall score; and
  displaying, by the computer system, a visualization of the suboptimal member layout.

2. The method of claim 1, wherein calculating the memory distance among the set of fields comprises:
  obtaining an average difference in the memory addresses between a pair of fields in the set of fields.

3. The method of claim 1, wherein the start of the execution unit comprises a thread start event and the end of the execution unit comprises a thread end event.

4. The method of claim 1, wherein the start of the execution unit is obtained from a user and the end of the execution unit comprises a duration of time after the start of the execution unit.

5. The method of claim 1, wherein the threshold is associated with a cache line of a processor cache in the computer system.

6. The method of claim 1, wherein the visualization comprises:
  a center representing a memory address of a selected field from the set of fields; and
  one or more fields in one or more regions around the center, wherein each of the one or more regions represents a relative distance in memory address from the center; and wherein each of the one or more regions comprises concentric rings around the center.

7. An apparatus, comprising:
  one or more processors; and
  memory storing instructions that, when executed by the one or more processors, cause the apparatus to:
    obtain an execution unit associated with execution of a software program, wherein the execution unit comprises a start and an end;
    identify a set of fields accessed within the execution unit;
    calculate one or more memory distances among the set of fields from a set of memory addresses of the set of fields during runtime of the software program, wherein the memory addresses of the set of fields move during runtime, and wherein the one or more memory distances comprise a difference in average memory address between a first field and a second field in the set of fields;

based at least in part on a memory distance in the one or more memory distances exceeding a threshold, store an indication that the execution unit has a suboptimal memory layout convert the one or more memory distances into one or more scores;

aggregate the one or more scores into an overall score for the execution unit;

order the execution unit with one or more additional execution units in the software program by the overall score; and display a visualization of the suboptimal memory layout.

8. The apparatus of claim 7, wherein calculating the memory distance among the set of fields comprises:
obtaining an average difference in the memory addresses between a pair of fields in the set of fields.

9. The apparatus of claim 7, wherein the start of the execution unit comprises a thread start event and the end of the execution unit comprises a thread end event.

10. The apparatus of claim 7, wherein the start of the execution unit is obtained from a user and the end of the execution unit comprises a duration of time after the start of the execution unit.

11. The apparatus of claim 7, wherein the threshold is associated with a cache line of a processor cache of the one or more processors.

12. The apparatus of claim 7, wherein the visualization comprises:
a center representing a memory address of a selected field from the set of fields; and
one or more fields in one or more regions around the center, wherein each of the one or more regions represents a relative distance in memory address from the center; and wherein each of the one or more regions comprises concentric rings around the center.

13. One or more non-transitory computer-readable storage media storing instructions that when executed by a computer cause the computer to perform a method, the method comprising:
obtaining an execution unit associated with execution of a software program, wherein the execution unit comprises a start and an end;
identifying, by a computer system, a set of fields accessed within the execution unit;
calculating, by the computer system, one or more memory distances among the set of fields from a set of memory addresses of the set of fields during runtime of the software program on the computer system, wherein the memory addresses of the set of fields move during runtime, and wherein the one or more memory distances comprise a difference in average memory address between a first field and a second field in the set of fields;
based at least in part on a memory distance in the one or more memory distances exceeding a threshold, storing an indication that the execution unit has a suboptimal memory layout;
converting the one or more memory distances into one or more scores;
aggregating the one or more scores into an overall score for the execution unit;
ordering the execution unit with one or more additional execution units in the software program by the overall score; and
displaying a visualization of the suboptimal memory layout.

14. The non-transitory computer-readable storage media of claim 13, wherein calculating the memory distance among the set of fields comprises:
obtaining an average difference in the memory addresses between a pair of fields in the set of fields.

15. The non-transitory computer-readable storage media of claim 13, wherein the start of the execution unit comprises a thread start event and the end of the execution unit comprises a thread end event.

* * * * *

UNITED STATES PATENT AND TRADEMARK OFFICE
CERTIFICATE OF CORRECTION

PATENT NO.         : 10,127,136 B2
APPLICATION NO.    : 15/004328
DATED              : November 13, 2018
INVENTOR(S)        : Denise et al.

Page 1 of 1

It is certified that error appears in the above-identified patent and that said Letters Patent is hereby corrected as shown below:

In the Claims

In Column 18, Line 32, in Claim 1, delete "member" and insert -- memory --, therefor.

Signed and Sealed this
Fifth Day of November, 2019

Andrei Iancu
*Director of the United States Patent and Trademark Office*